Dec. 17, 1946. T. NELSON 2,412,744
INSULATION STUD
Filed July 24, 1944
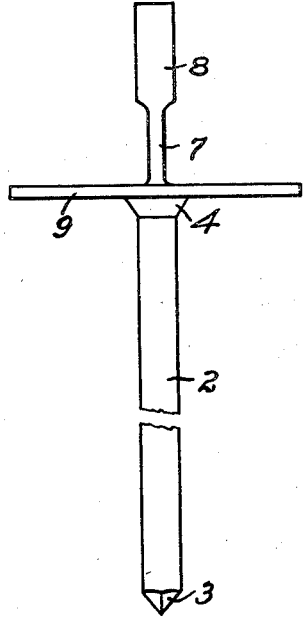
FIG. 1. FIG. 2. FIG. 3.
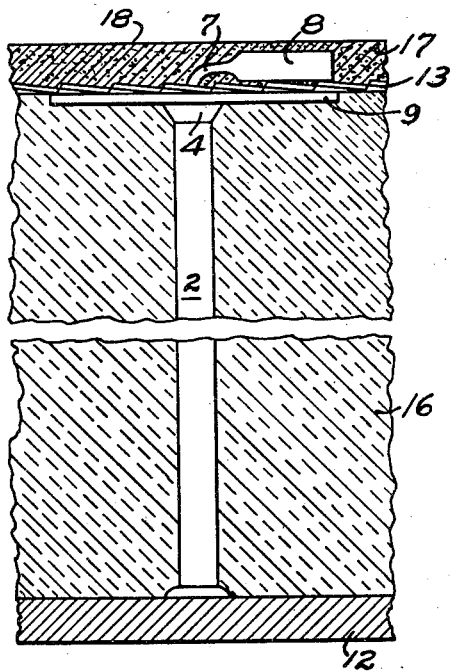
FIG. 4.
FIG. 5.
INVENTOR
TED NELSON
BY Charles S. Evans
his ATTORNEY Patented Dec. 17, 1946

2,412,744

UNITED STATES PATENT OFFICE 2,412,744

INSULATION STUD

Ted Nelson, San Leandro, Calif.

Application July 24, 1944, Serial No. 546,415

5 Claims. (Cl. 72—16)

1

My invention relates to welding studs; and particularly to welding studs useful in a wall construction in which metal lath is utilized to retain an insulating layer against a steel wall and to be concealed in a relatively thin plaster surface coating.

One of the objects of the invention is the provision of a stud having means embodied therewith for securing to the stud a separate broad head, and also securing against the head a sheet of metal lath or other foraminated material.

Another object of the invention is the provision of a rapid method of applying a sheet of metal lath and concealing plaster on the outer surface of a layer of insulation lying against a steel wall, the whole being tied securely together.

The over all object of the invention is the provision of an effective and at the same time thoroughly practical means for fastening a plaster or composition layer to a steel plate usually constituting a wall; the element of practicality including consideration of cost of manufacture and time required for application.

My invention possesses other objects and features of value which with the foregoing will be explained in the following description. It is to be understood that I do not limit myself to the showing made by the said description and the drawing as I may adopt variant forms of the invention within the scope of the appended claims.

Referring to the drawing:

Figures 1 and 2 are elevations showing the stud. The planes of projection are at right angles to each other.

Figure 3 is an elevation similar to that of Figure 2, but including the broad attachable head.

Figure 4 is a plan view of the head separated from the body of the stud.

Figure 5 is a horizontal sectional view through a wall in which my stud is used to secure the wall elements together. A portion of the figure is omitted to shorten the view.

In terms of broad inclusion, my invention comprises a pointed stud adapted to be thrust through an insulating layer of glass wool lying against a steel wall or backing plate, and then to be welded to the backing plate. The stud is provided with a shoulder and a shank extending from the body of the stud beyond the shoulder. A separate broad head which is conveniently made as a disk, may be passed over the shank to seat against the shoulder, in which position it presses into the surface of the insulation layer to retain it in place. A sheet of expanded metal or metal lath is then

2 slipped over the shank to lie snugly against the broad head; and the shank is bent over with a hammer to secure all together. A finishing plaster coat of any desired composition may then be applied over the metal lath, the thickness being such as to completely bury and hide the bent over shank. The point on the stud permits the stud to be pushed through the insulating layer at any desired point and scratch a metal-to-metal contact with the wall for welding thereto; and the shank provides a simple and effective means for holding the metal lath against the stud head while also providing an end by which the stud is conveniently held in the welding machine.

In greater detail, my invention comprises a stud body 2, having a pointed end 3 at one end and an annular shoulder 4 at the other end. Extending beyond the shoulder is a shank which for convenience of description may be divided into three parts. The base of the shank is cylindrical and forms a bead 6 the same diameter as the body. Rising from the bead 6 is the flat neck 7 of strap-like cross section, formed by pressure of a die which widens the shank in the view seen in Figure 1, and narrows it in the view shown in Figure 2. Beyond the neck, the original cylindrical stock extends in a tip 8.

Each of the three shank parts play an important role in the application and function of the stud. The bead 6 centers the flat broad disk forming the thin head 9, which seats against the shoulder. The head is formed with the slotted aperture 11 as shown in the center, so that after the stud has been welded to the wall 12, the head may be pushed over the shank.

The tip 8 provides a secure means by which the stud is gripped in the chuck of the welding machine; and the flattened neck permits the shank to be bent over easily to position the tip against the metal lath 13, which previously has been laid against the heads, with the shanks projecting through.

My invention has an important application in ship building, and for illustration it can be assumed that the metal wall 12 separates a hot furnace room or stoke hold from crew quarters or other space from which it is desired to exclude conducted heat. Layers 16 of glass wool or other comparable thermal insulation are first laid against the wall, and held manually while a few studs held in the chuck of a welding machine are thrust through the layer and welded to the wall. The length of the stud is of course determined by the thickness of the insulating layer; and proportions are such that the shoulder 4 of the stud buries itself in the material with the flat face of the shoulder slightly below the surface.

After the first few holding studs are put in, others for the permanent holding of the insulation are applied. Then a head 9 is pushed down over each shank to seat against the shoulder around the bead 6 of the shank, and a sheet of metal lath 13 is laid against the heads. The shanks are next bent over with hammer blows to hold the metal lath in place. Finally a layer 17 of plaster is applied as a finish, burying and concealing the bent-over shanks and tips and interlocking in the metal lath so that a wall surface 18 desirable for living quarters is provided to receive paint or other treatment.

I claim:

1. A metal lath stud comprising a body, a shoulder disposed on the body, a bendable shank extending from the shoulder, and a separate head to seat on the shoulder and having an aperture through which the shank passes to provide a tip over which the metal lath may be passed to lie against the head.

2. A metal lath stud comprising a body, a shoulder disposed on the body, a shank extending from the shoulder, a tip on the free end of the shank, and a separate thin disk forming a head and apertured to pass entirely over the tip and to seat on the shoulder to support the metal lath, said shank being bendable whereby the tip may be bent down against the lath to hold it against the head and the head against the shoulder.

3. A metal lath stud comprising a body, a shoulder disposed on the body, a shank of strap-like cross section extending from the shoulder and having at its juncture therewith a bead, and a separate head apertured with a slot to pass over the shank and an enlargement of the slot to seat around the bead and against the shoulder.

4. A metal lath stud comprising a body, a shoulder disposed on the body, a shank extending from the shoulder first in a cylindrical bead and then in a wide thin portion, and a separate head having a slotted aperture to pass over the shank and lock against the shoulder around the bead and under the wide portion of the shank.

5. The method of applying imperforate insulating sheets to a metal wall which comprises placing a sheet of the material against the wall, pushing a metal stud through the sheet to engage the wall and then welding the stud to the wall while embedded in the sheet, applying a head to the stud to lie against the sheet with the end of the stud projecting beyond the head, laying a sheet of metal lath on the head with the projecting end of the stud extending through the lath, bending over the projecting stud end to hold the lath on the stud against the head, and applying a plaster layer over the metal lath to conceal the stud ends.

TED NELSON.